(12) United States Patent
Wakabayashi et al.

(10) Patent No.: US 8,189,293 B1
(45) Date of Patent: May 29, 2012

(54) PERPENDICULAR MAGNETIC RECORDING HEAD HAVING A GROOVED WRAP AROUND SHIELD AND METHOD FOR MANUFACTURING THE SAME

(75) Inventors: Yasuhiro Wakabayashi, Hiratsuka (JP); Kazue Kudo, Odawara (JP); Shouji Tokutake, Odawara (JP); Hiromi Shiina, Hitachi (JP); Yohji Maruyama, Iruma (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 13/096,775

(22) Filed: Apr. 28, 2011

(51) Int. Cl.
*G11B 5/31* (2006.01)
(52) U.S. Cl. .................................................. 360/110
(58) Field of Classification Search .............. 360/110
See application file for complete search history.

(56) References Cited

U.S. PATENT DOCUMENTS

| 6,710,973 | B2 | 3/2004 | Okada et al. | |
|---|---|---|---|---|
| 6,738,232 | B1* | 5/2004 | Sasaki | 360/317 |
| 6,791,795 | B2* | 9/2004 | Ohtomo et al. | 360/125.43 |
| 7,295,401 | B2 | 11/2007 | Jayasekara et al. | |
| 7,333,296 | B2* | 2/2008 | Sasaki et al. | 360/125.03 |
| 7,656,612 | B2* | 2/2010 | Sasaki et al. | 360/125.14 |
| 7,933,095 | B2* | 4/2011 | Sasaki et al. | 360/125.12 |
| 7,952,839 | B2* | 5/2011 | Yamazaki et al. | 360/324.1 |
| 2006/0158780 | A1 | 7/2006 | Lee et al. | |
| 2007/0177301 | A1 | 8/2007 | Han et al. | |
| 2007/0223141 | A1 | 9/2007 | Gomi et al. | |
| 2008/0112081 | A1 | 5/2008 | Matono | |
| 2008/0266724 | A1 | 10/2008 | Yazawa et al. | |
| 2008/0297945 | A1 | 12/2008 | Han et al. | |
| 2010/0147792 | A1 | 6/2010 | Lee et al. | |
| 2010/0159282 | A1 | 6/2010 | Lee et al. | |
| 2010/0165517 | A1 | 7/2010 | Araki et al. | |

FOREIGN PATENT DOCUMENTS

| JP | 2008/300027 | | 11/2008 |
|---|---|---|---|
| JP | 2009/129496 | A | 6/2009 |
| JP | 2010/061726 | A | 3/2010 |
| WO | 2009/069232 | A1 | 6/2009 |

OTHER PUBLICATIONS

Liu et al., "Characterization of Skip or Far Track Erasure in a Side Shield Design," 2009 IEEE IEEE Transactions on Magnetics, vol. 45, No. 10, Oct. 2009, pp. 3660-3663.

* cited by examiner

*Primary Examiner* — Mark Blouin
(74) *Attorney, Agent, or Firm* — Zilka-Kotab, PC

(57) ABSTRACT

According to one embodiment, a perpendicular magnetic recording head includes a shield having a groove and a main magnetic pole positioned in the groove of the shield. The groove includes a bottom side near a leading edge of the shield and inclined sides extending from the bottom side toward a trailing edge of the shield and from an ABS side of the head to a recessed side of the shield opposite the ABS. The shield is coupled to a non-magnetic layer at the recessed side, a cross-sectional area of the groove is less at a position nearer to the substrate than a position farther from the substrate, a cross-sectional area of the groove is less at a position nearer to the ABS side of the shield than a position farther from the ABS side of the shield, and a portion of the sides of the groove have curved surfaces.

20 Claims, 14 Drawing Sheets

US 8,189,293 B1

PERPENDICULAR MAGNETIC RECORDING HEAD HAVING A GROOVED WRAP AROUND SHIELD AND METHOD FOR MANUFACTURING THE SAME

FIELD OF THE INVENTION

The present invention relates to magnetic storage devices, and more particularly to a magnetic recording head having a grooved wrap around shield.

BACKGROUND OF THE INVENTION

Many modern computers rely on magnetic disk drives with which to store data, with the most popular magnetic disk drive being a hard disk drive (HDD). The HDD includes a rotating magnetic disk, write and read heads that are suspended by a suspension arm adjacent to a surface of the rotating magnetic disk, and an actuator that swings the suspension arm to place the read and write heads over selected circular tracks on the rotating disk. The read and write heads are directly located on a slider that has an air bearing surface (ABS). The suspension arm biases the slider into contact with the surface of the disk when the disk is not rotating, but when the disk rotates, air is swirled by the rotating disk. When the slider rides on the ABS, the write and read heads are employed for writing magnetic impressions to and reading magnetic impressions from the rotating disk. The read and write heads are connected to processing circuitry that operates according to computer readable programming code to implement the writing and reading functions.

The write head includes at least a coil, a write pole, and one or more return poles. When a current flows through the coil, a resulting magnetic field causes a magnetic flux to flow through the write pole, which results in a magnetic write field emitting from the tip of the write pole. This magnetic field is sufficiently strong that it locally magnetizes a portion of the adjacent magnetic disk, thereby recording a bit of data. The write field then travels through a magnetically soft underlayer of the magnetic medium to return to the return pole of the write head.

In current perpendicular magnetic recording medium head designs, the perpendicular magnetic field easily dissipates in the direction of the recording track width, producing frequent erroneous writes, to adjacent tracks. Current approaches to rectifying this problem include strategically placing shields in the vicinity of the magnetic pole, and alternatively or in combination with placing the main magnetic pole in a groove of the shielding material. This approach, however, experiences adverse data loss due to magnetic field leakage caused by vibrations and motion of the magnetic walls during operation. Ultimately, this data loss precludes desirable reliability contingent upon the existence of a margin within the HDD device wherein data may be recorded multiple times to the same location.

Thus, it would be beneficial to the field of magnetic data storage to provide a method and apparatus to overcome the above limitations of magnetic shielding approaches and thereby to reliably prevent magnetic field leakage to adjacent tracks during operation.

SUMMARY OF THE INVENTION

According to one embodiment, a perpendicular magnetic recording head includes a shield having a groove above a substrate, and a main magnetic pole positioned at least partially in the groove of the shield. The groove includes a bottom side near a leading edge of the shield, inclined sides extending from the bottom side toward a trailing edge of the shield, the inclined sides extending from a front surface side of the shield positioned closest to an air bearing surface (ABS) of the head to a recessed side of the shield opposite the front surface side of the shield, wherein the shield is coupled to a non-magnetic layer at the recessed side, a cross-sectional area of the groove taken parallel to an interface of the substrate and the shield at a position nearer to the substrate is less than a cross-sectional area of the groove taken parallel to the interface of the substrate and the shield at a position farther from the substrate, a cross-sectional area of the groove taken parallel to the front surface side of the shield at a position nearer to the front surface side of the shield is less than a cross-sectional area of the groove taken parallel to the front surface side of the shield at a position farther from the front surface side of the shield, and at least a portion of the sides of the groove have curved surfaces.

According to another embodiment, a method for manufacturing a perpendicular magnetic recording head includes forming a substrate, forming a shield above the substrate, forming a groove in the shield, and forming a main magnetic pole at least partially in the groove of the shield.

These and other features and advantages of the invention will be apparent upon reading of the following detailed description of preferred embodiments taken in conjunction with the figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings, which are not to scale.

FIG. 98 is a schematic cross-sectional diagram of a perpendicular magnetic recording head during manufacture continued from FIG. 8B, according to one embodiment.

DETAILED DESCRIPTION OF THE PREFERRED EMBODIMENTS

The following description is of the best embodiments presently contemplated for carrying out this invention. This description is made for the purpose of illustrating the general principles of this invention and is not meant to limit the inventive concepts claimed herein.

According to one general embodiment, a perpendicular magnetic recording head includes a shield having a groove above a substrate, and a main magnetic pole positioned at least partially in the groove of the shield. The groove includes a bottom side near a leading edge of the shield, inclined sides extending from the bottom side toward a trailing edge of the shield, the inclined sides extending from a front surface side of the shield positioned closest to an air bearing surface (ABS) of the head to a recessed side of the shield opposite the front surface side of the shield, wherein the shield is coupled to a non-magnetic layer at the recessed side, a cross-sectional area of the groove taken parallel to an interface of the substrate and the shield at a position nearer to the substrate is less than a cross-sectional area of the groove taken parallel to the interface of the substrate and the shield at a position farther from the substrate, a cross-sectional area of the groove taken parallel to the front surface side of the shield at a position nearer to the front surface side of the shield is less than a cross-sectional area of the groove taken parallel to the front surface side of the shield at a position farther from the front surface side of the shield, and at least a portion of the sides of the groove have curved surfaces.

According to another general embodiment, a method for manufacturing a perpendicular magnetic recording head includes forming a substrate, forming a shield above the substrate, forming a groove in the shield, and forming a main magnetic pole at least partially in the groove of the shield.

Perpendicular magnetic recording (PMR) heads are widely used to achieve a high surface recording density. Some problems of typical perpendicular magnetic heads are that the perpendicular magnetic field easily spreads in the direction of the recording track width and error writes to adjacent tracks are easily produced. A typical method to address these problems is to provide shields above (trailing side) and on the sides of the main magnetic pole to reduce unwanted magnetic fields. In order to narrow the track width accompanying higher recording densities that have been achieved in recent years, reducing the unwanted magnetic field in order to suppress write errors to adjacent tracks and lower manufacturing costs are goals of the industry.

Embodiments of the present invention are described in detail below with reference to the drawings. The structure of a perpendicular magnetic recording head according to one embodiment is described in FIG. 1, which shows a cross-sectional view parallel to an ABS side and on a side away from the ABS of the perpendicular magnetic recording head.

Figure 1:
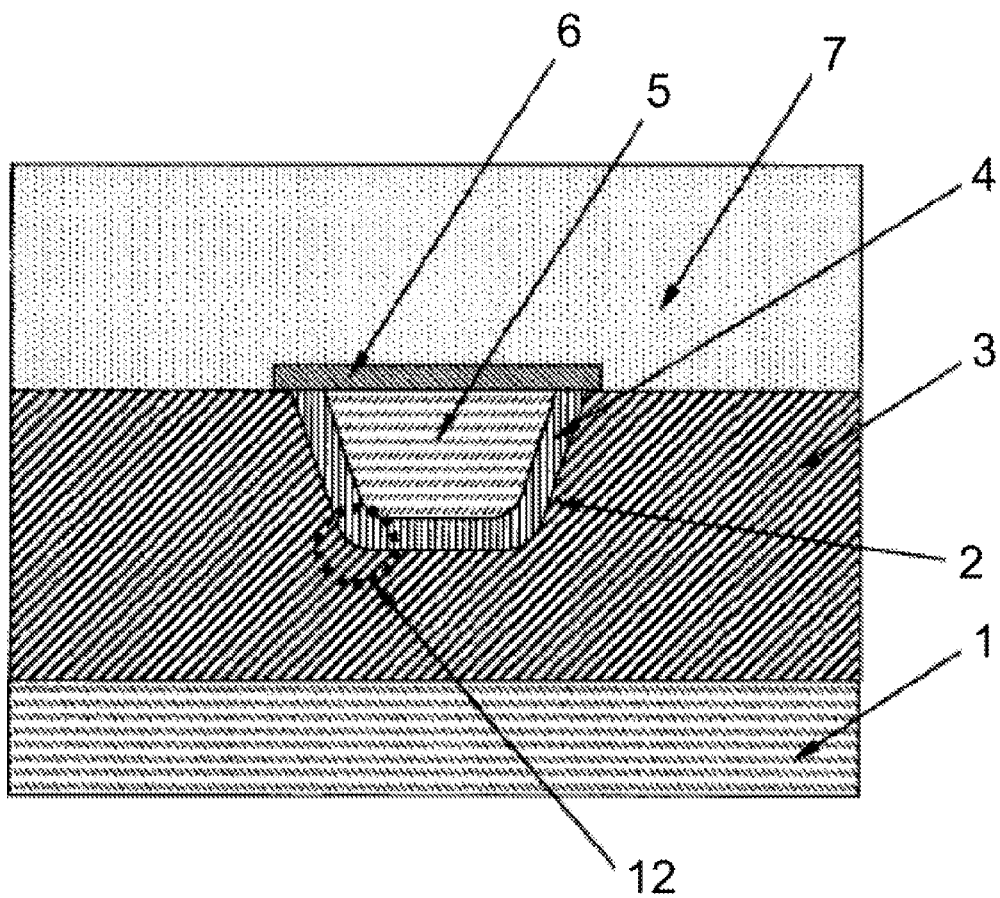
FIG. 1 is a schematic cross-sectional diagram of a perpendicular magnetic recording head, according to one embodiment.
Figure 2:
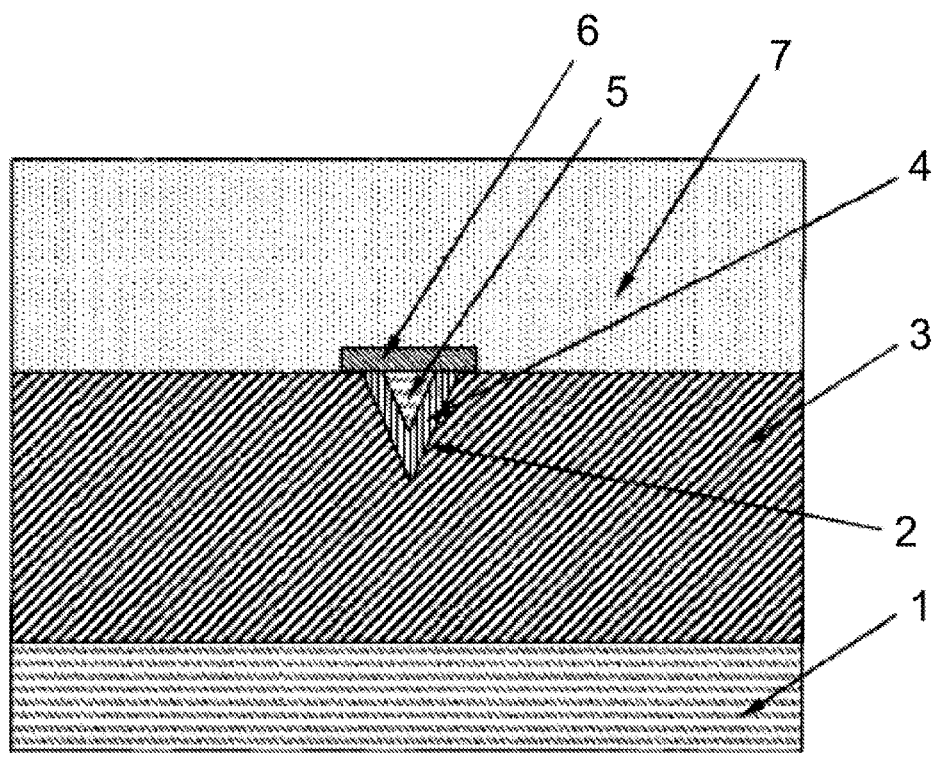
FIG. 2 is a schematic cross-sectional diagram of a ABS of a perpendicular magnetic recording head, according to one embodiment.
Figure 3:
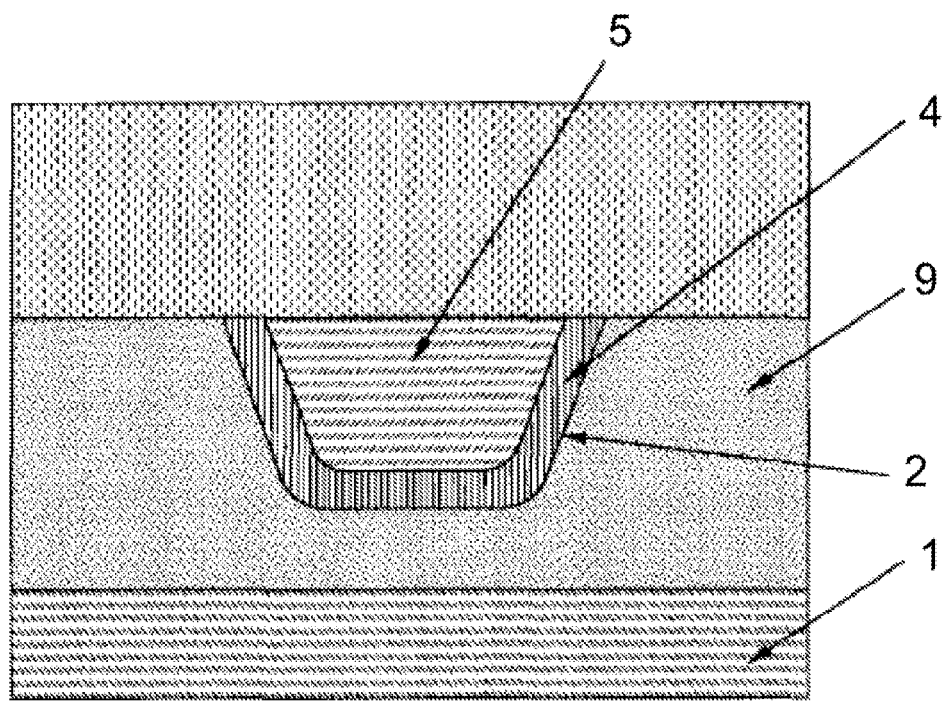
FIG. 3 is a schematic cross-sectional diagram of a recessed side of a shield of a perpendicular magnetic recording head, according to one embodiment.

In FIGS. 1-3, the side of the shield nearest to the ABS (as shown in FIG. 2 is referred to as the "front," the side away from the ABS (as shown in FIG. 1) as the "recessed," the trailing side as the "top," and the leading side as the "bottom."

Referring to FIG. 1, a perpendicular magnetic recording head, according to one embodiment, comprises a shield layer 3 formed with a groove 2, a side gap layer 4 formed to cover the interior of the groove, a main magnetic pole 5 formed to be embedded inside the groove covered by the side gap layer, a trailing gap layer 6 formed to cover the top part of the main magnetic pole, and a trailing shield 7 formed to cover the gap layer and the shield layer 3 on a substrate 1.

The groove 2 has a shape that extends from the ABS to the recessed side of the shield and the sides are inclined to widen in the direction from the bottom to the top of the main magnetic pole, and at least a part of the section formed in the shield layer 3 is a curved surface 12.

In other words, the groove 2 of the shield 3 comprises a bottom side near a leading edge of the shield, and inclined sides extending from the bottom side toward a trailing edge of the shield, with the inclined sides extending from a front surface side of the shield positioned closest to an ABS of the head to a recessed side of the shield opposite the front surface side of the shield. The shield 3 is coupled to a non-magnetic layer (9 in FIG. 3) at the recessed side, a cross-sectional area of the groove (2, FIG. 1) taken parallel to an interface of the substrate 1 and the shield at a position nearer to the substrate is less than a cross-sectional area of the groove taken parallel to the interface of the substrate and the shield at a position farther from the substrate. Also, a cross-sectional area of the groove 2 taken parallel to the front surface side of the shield 3 at a position nearer to the front surface side of the shield is less than a cross-sectional area of the groove taken parallel to the front surface side of the shield at a position farther from the front surface side of the shield.

In one embodiment, at least a portion of the sides of the groove 2 have curved surfaces 12. In a further embodiment, the at least a portion of the sides of the groove 2 that have the curved surfaces may be near the recessed side of the shield 3, as shown in FIG. 1.

The shield layer 3 has the front side connected to the ABS and shields the front end of the main magnetic pole 5 in the recording track width direction and from below. In other words, the head comprises a main magnetic pole 5 positioned at least partially in the groove 2 of the shield 3.

In addition, the shield layer 3 is connected to a non-magnetic material 9 on the recessed side as shown in FIG. 3. The groove 2 is also formed in the non-magnetic material 9 on the recessed side of the shield. For example, the shield layer may have a thickness from about 200 nm to about 500 nm and may comprise a magnetic material.

The side gap layer 4 is provided to separate the main magnetic pole 5 and the shield layer 3 and is formed to cover the interior of the groove 2 formed in the shield layer 3. For example, the side gap layer may have a film thickness from about 20 nm to about 100 nm and may include a non-magnetic material, such as alumina.

The main magnetic pole 5 generates a recording magnetic field from the front end on the ABS side and may comprise a magnetic material. In addition, the main magnetic pole 5 is formed to fill the void shape of the side gap layer 4 formed in the groove 2.

The trailing gap layer 6 is provided to separate the main magnetic pole 5 and the trailing shield 7, and is formed to cover the top of the main magnetic pole 5. For example, the trailing gap layer 6 may have a film thickness from about 10 nm to about 40 nm and may comprise a non-magnetic material, such as alumina. The trailing shield 7 is provided to shield the front end of the main magnetic pole 5 from above and may comprise a magnetic material.

In more embodiments, the perpendicular magnetic recording head may comprise a side gap layer 4 positioned between the main magnetic pole 5 and the shield 3, with the side gap layer possibly comprising a non-magnetic material.

According to one embodiment, the shield 3 may comprise a multi-layered film, with the multi-layered film having a lower shield near the substrate 1 and below the main magnetic pole 5, and side shields adjacent the sides of the groove 2 and above the lower shield.

FIG. 2 shows the ABS of the perpendicular magnetic recording head shown in FIG. 1. In FIG. 2, the groove 2 shape at the position of the ABS is an inverted triangular shape, but at the recessed side of the shield 3, the pattern width becomes wider, and the flat section is formed from some position in the bottom of the groove to become an inverted trapezoidal shape. In other words the main magnetic pole S may have an inverted triangular cross-sectional shape near the ABS, with one corner of the triangular shape being nearer the leading edge of the shield 3, and two other corners of the triangular shape being nearer the trailing edge of the shield 3.

In the recessed side from the region forming the flat section at the bottom of the groove, as shown in FIG. 1, a part of the groove formed in the shield layer may be formed by a curved surface 12. In the example in FIG. 2, the groove shape at the ABS is an inverted triangular shape, and the flat section is not formed in the bottom of the groove. However, when the flat section is formed in the bottom of the groove even at the position of the ABS, the groove formed in the shield layer has a portion formed into a curved surface even at the position of the ABS.

FIG. 3 shows the cross-sectional view at a part of the non-magnetic material 9 provided on the recessed side of the shield layer 3 of the perpendicular magnetic recording head as shown in FIGS. 1 and 2. In the head as shown in FIG. 3, according to one embodiment, a part of the groove formed in the non-magnetic material 9 may be formed into a curved surface. However, the groove in the non-magnetic material 9 does not necessarily have to form at least that section of the groove into a curved surface. The main magnetic pole 5 has a flare structure for increasing the cross-sectional area in the direction from the ABS to the recessed side and, in particular, has a structure having a substantial change in the cross-sectional area from the end on the recessed side of the shield layer 3 to the ABS.

In more embodiments, the non-magnetic layer 9 may comprise a groove, the groove of the non-magnetic layer extending from the groove 2 of the shield 3. The main magnetic pole 5 may be positioned at least partially in the groove of the non-magnetic layer, with a cross-sectional area of the groove of the non-magnetic layer taken parallel to an interface of the non-magnetic layer and the shield at a position nearer to the interface of the non-magnetic layer and the shield being less than a cross-sectional area of the groove of the non-magnetic layer taken parallel to the interface of the non-magnetic layer and the shield at a position farther from the interface of the non-magnetic layer and the shield.

In another embodiment, a cross-sectional area of the main magnetic pole 5 at a position in the groove 2 of the shield 3 is less than a cross-sectional area of the main magnetic pole at a position in the groove of the non-magnetic layer 9, with the cross-sectional area of the main magnetic pole being taken parallel to the interface of the non-magnetic layer and the shield.

Figure 4:
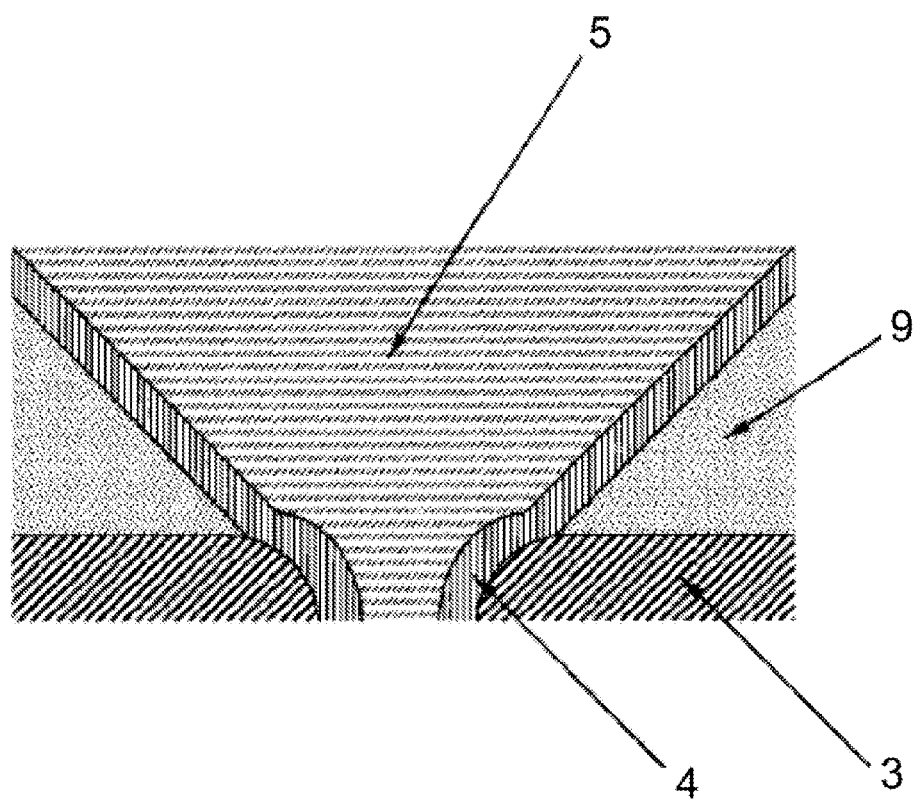
FIG. 4 is a schematic diagram showing a top view of a perpendicular magnetic recording head during manufacture, according to one embodiment.

FIG. 4 shows a top view of the perpendicular magnetic recording head shown in FIGS. 1-3. In this structure, the width in a track width direction of the main magnetic pole 5 has a structure which increases from the ABS toward the recessed side, and the width in the vicinity of the end on the recessed side at the shield layer 3 is changed significantly. In other words, according to one embodiment, a first flare angle of the main magnetic pole 5 near the recessed side of the shield 3 may be greater than each of: a second flare angle of the main magnetic pole near the ABS and a third flare angle of the main magnetic pole near an interface of the non-magnetic layer 9 and the shield, with each flare angle being measured from perpendicular to a plane of the ABS and sides of the main magnetic pole.

Next, a method for manufacturing a perpendicular magnetic recording head, such as that shown in FIGS. 1-4, for example, is described. FIGS. 5A-5B, 6A-6B, 7A-7B, 8A-8B, 9A-9B, and 10A-10B show a method for manufacturing a perpendicular magnetic recording head, according to one embodiment, and each figure is a cross-sectional view of a corresponding location in FIG. 1. FIGS. 5B-10B are cross-sectional views in a direction perpendicular to the cross-sectional direction of FIGS. 5A-10A.

Figure 5A:
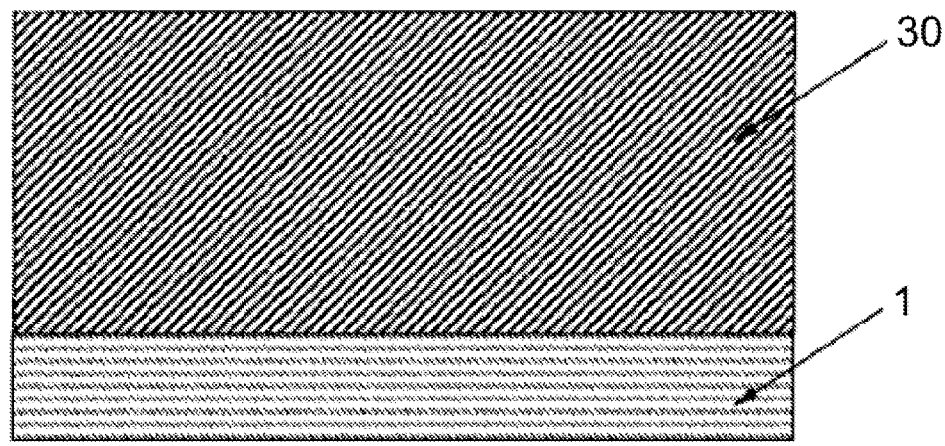
FIG. 5A is a schematic cross-sectional diagram of a perpendicular magnetic recording head during manufacture, according to one embodiment.
Figure 5B:
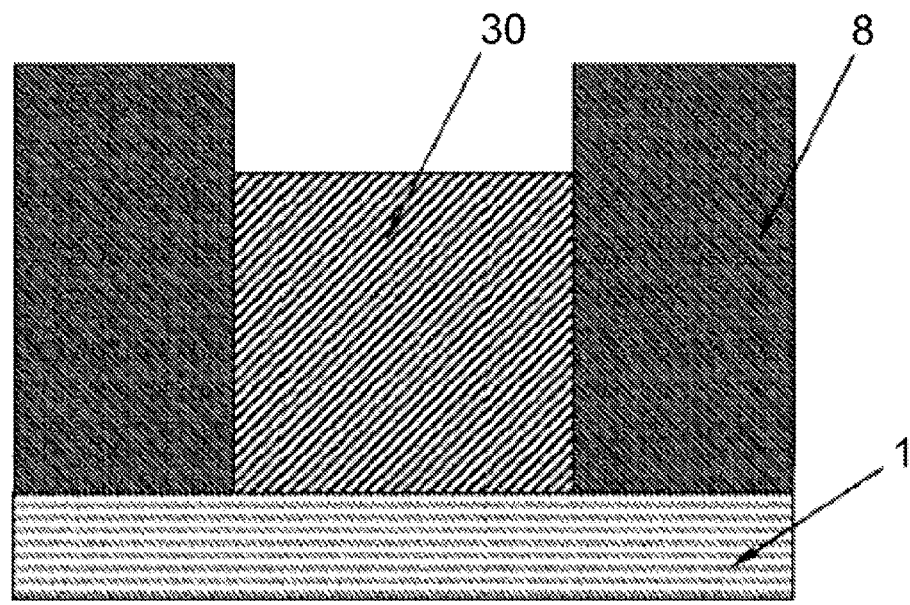
FIG. 5B is a schematic cross-sectional diagram of a perpendicular magnetic recording head during manufacture in a direction perpendicular to the cross-sectional direction of FIG. 5A.

After the seed film (not shown) for growing a plating layer is deposited on a substrate 1 shown in FIGS. 5A-5B, a pattern may be formed by a photoresist in a shape of the shield layer. The plating film is grown to form a shield material 30. The shield material may be a magnetic material, such as a nickel-iron alloy.

Figure 6A:
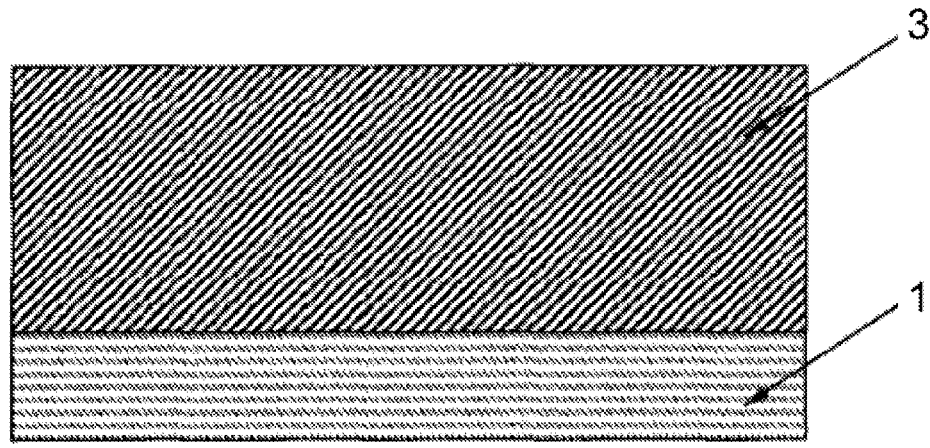
FIG. 6A is a schematic cross-sectional diagram of a perpendicular magnetic recording head during manufacture continued from FIG. 5A, according to one embodiment.
Figure 6B:
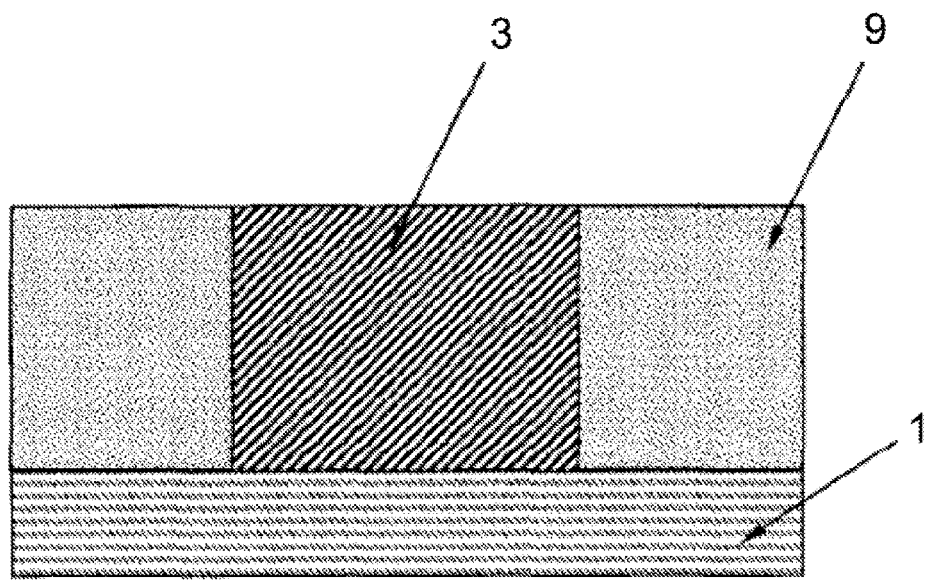
FIG. 6B is a schematic cross-sectional diagram of a perpendicular magnetic recording head during manufacture continued from FIG. 5B, according to one embodiment.

After the photoresist 8 is removed and a non-magnetic material is deposited in a layer, as shown in FIGS. 6A-6B, a method, such as chemical mechanical polishing (CMP) may be used to planarize the substrate 1 surface and adjust the film thickness of the shield layer 3 and the non-magnetic layer 9. The non-magnetic material layer may be aluminum oxide or silicon dioxide, in some approaches. Methods other than those described herein, such as ion deposition, plating, sputtering, etc., may be used to form the shield layer or any other layer, such as a method which patterns the layered film after forming the layered film of the shield material from a vacuum-deposited film.

When the groove 2 is formed on the shield layer 3 and the non-magnetic layer 9, a mask material is formed to become the etching mask. Since the groove 2 may be formed via ion milling, reactive ion etching (RIE), both ion milling and RIE, or any other method as would be understood by one of skill in the art upon reading the present descriptions, a mask material having a slower etching rate than the shield layer 3 is selected for the respective etching method. In addition, in order to layer the mask material, the materials and their combination are selected as would be understood by one of skill in the art upon reading the present descriptions.

Figure 7A:
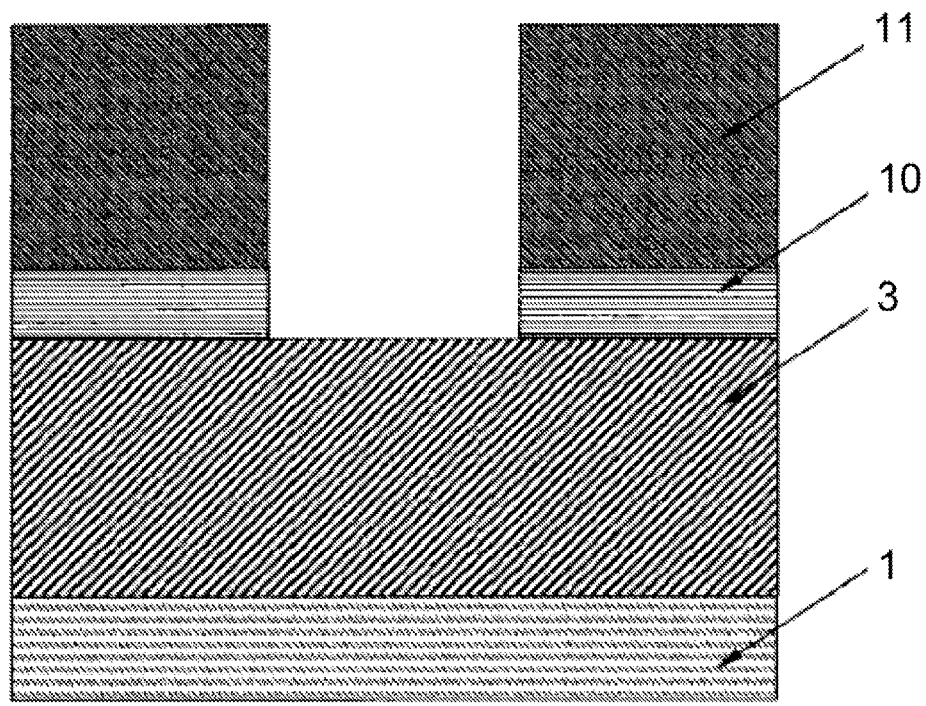
FIG. 7A is a schematic cross-sectional diagram of a perpendicular magnetic recording head during manufacture continued from FIG. 6A, according to one embodiment.
Figure 7B:
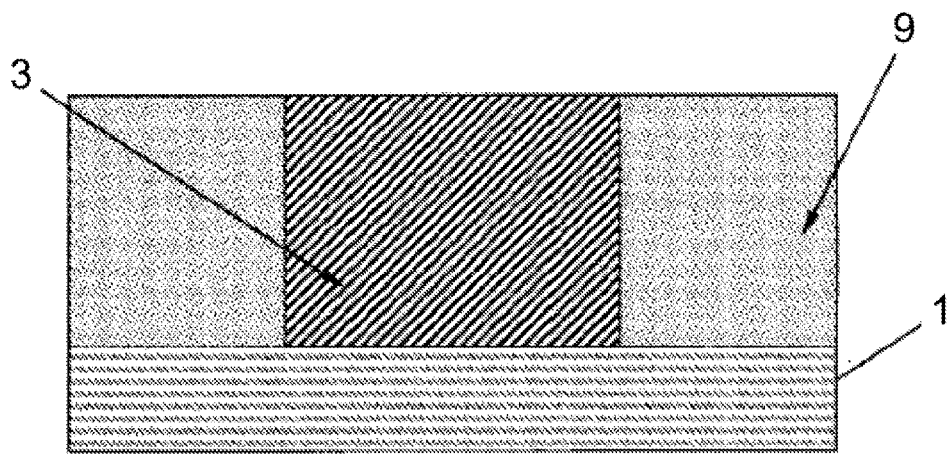
FIG. 7B is a schematic cross-sectional diagram of a perpendicular magnetic recording head during manufacture continued from FIG. 6B, according to one embodiment.

Next, as shown in FIGS. 7A-7B, a photoresist pattern 11 having an opening with the desired shape of the main magnetic pole is formed. The etching mask material is selectively etched with the photoresist as the mask to form the etching mask 10.

Figure 8A:
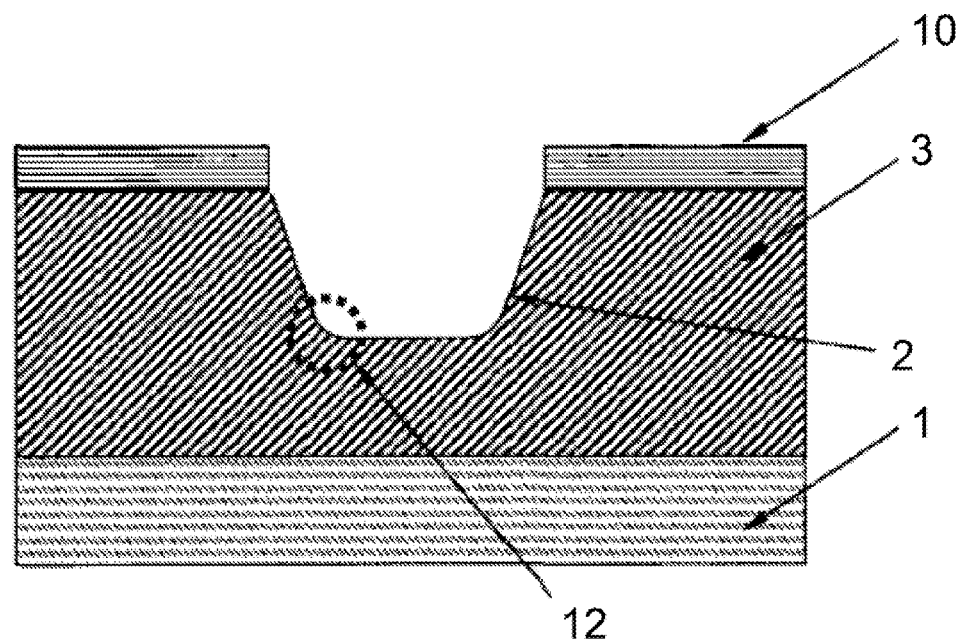
FIG. 8A is a schematic cross-sectional diagram of a perpendicular magnetic recording head during manufacture continued from FIG. 7A, according to one embodiment.
Figure 8B:
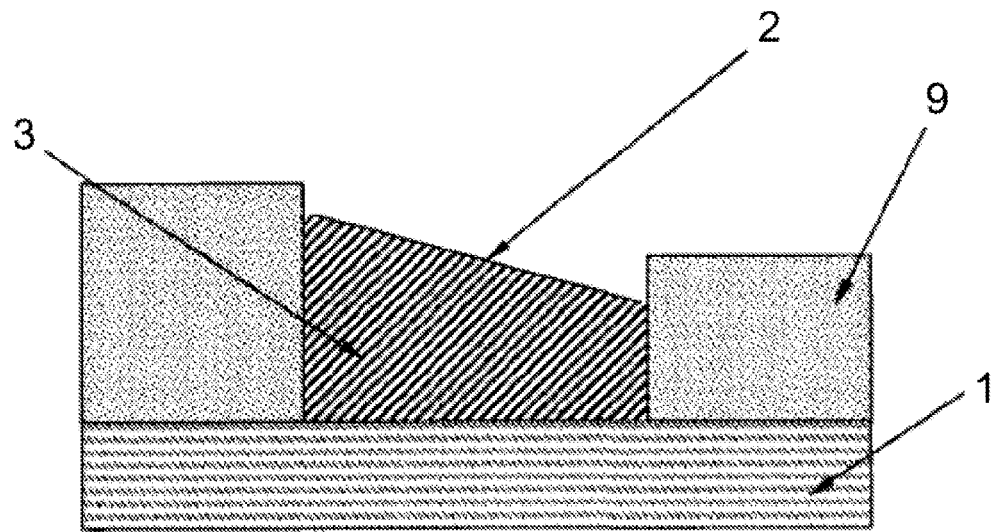
FIG. 8B is a schematic cross-sectional diagram of a perpendicular magnetic recording head during manufacture continued from FIG. 7B, according to one embodiment.

Next, as shown in FIGS. 8A-8B, at least one of ion milling and RIE may be used to etch the shield layer 3 with the etching mask 10 as the mask. By setting the dimensions of the etching mask 10 and the angles of the side walls of the groove 2 beforehand so that the groove 2 formed in the shield layer 3 becomes an inverted triangular shape at the position of the ABS, a groove shape of an inverted triangular shape is obtained at the position of the ABS. In addition, since the pattern width is wider on the recessed side of the shield, the flat section is formed on the bottom of the groove, and the groove becomes an inverted trapezoidal shape. By adjusting the incident angle of the ions, the angle of the bottom surface side of the trapezoidal shape can be formed into a curved surface.

By using this incident angle of the ions, the groove 2 formed in the shield layer 3 becomes an inverted triangular shape at the ABS, and the part on the recessed side becomes an inverted trapezoidal shape formed with the curved surface 12. The depth of the groove 2 can be increased from the ABS having a narrow pattern width to the recessed side of the shield having a wide width by using the so-called loading effect which is a different etching rate depending on the pattern width when RIE is used. Depending on the incline of the shield layer 3 formed here, the cross-sectional area of the groove from the ABS to the recessed side can be substantially increased, and the cross-sectional area of the main magnetic pole 5 formed inside of the groove can be varied greatly by sandwiching the side gap layer 4. When RIE is used to etch the shield layer 3, the etching gas may be a gas mixture containing $CH_3OH$ gas and/or $CO/NH_3$ gases, according to several embodiments. Of course, other gases and methods may be used would be understood by one of skill in the art upon reading the present descriptions.

Usually, the shield layer 3 and the non-magnetic layer 9 have different etching rates. When the etching of the shield layer 3 is completed, a groove shallower than the groove formed in the shield layer is formed in the non-magnetic layer 9. In the non-magnetic material on the recessed side of the shield, the cross-sectional area of the main magnetic pole is smaller than the cross-sectional area in the shield layer part, and an adequate magnetic field cannot be generated by the main magnetic pole. Therefore, etching of the non-magnetic material 9 continues.

Etching by RIE may be conducted by using an appropriate gas such as boron trichloride when aluminum oxide is used as the non-magnetic layer 9, in one approach, or carbon tetrafluoride when silicon dioxide is used, in another approach. Of course, other appropriate pairings of other etching gasses according to the composition of the non-magnetic layer 9 may be utilized, as understood by one having ordinary skill in the art upon reading the present descriptions.

Figure 9A:
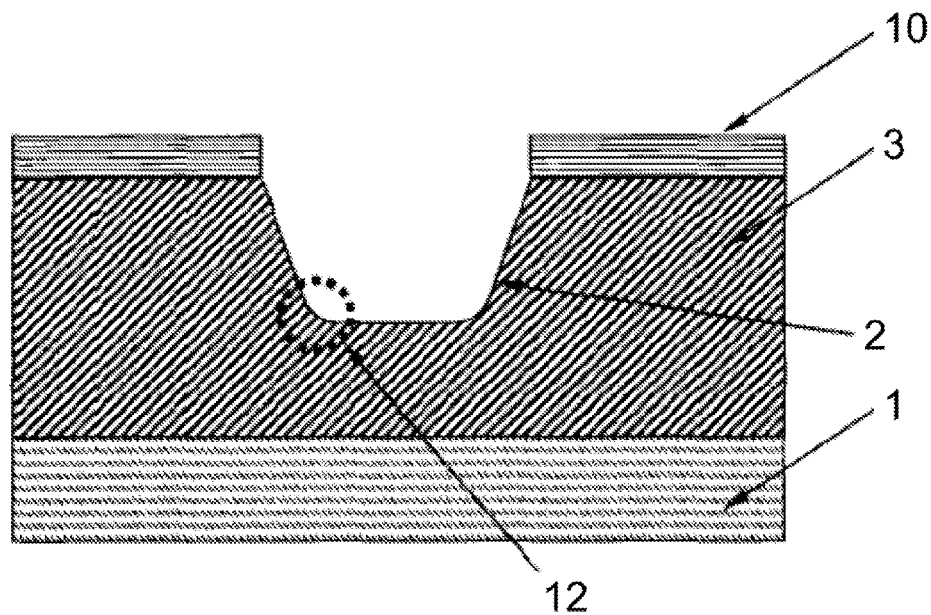
FIG. 9A is a schematic cross-sectional diagram of a perpendicular magnetic recording head during manufacture continued from FIG. 8A, according to one embodiment.
Figure 9B:
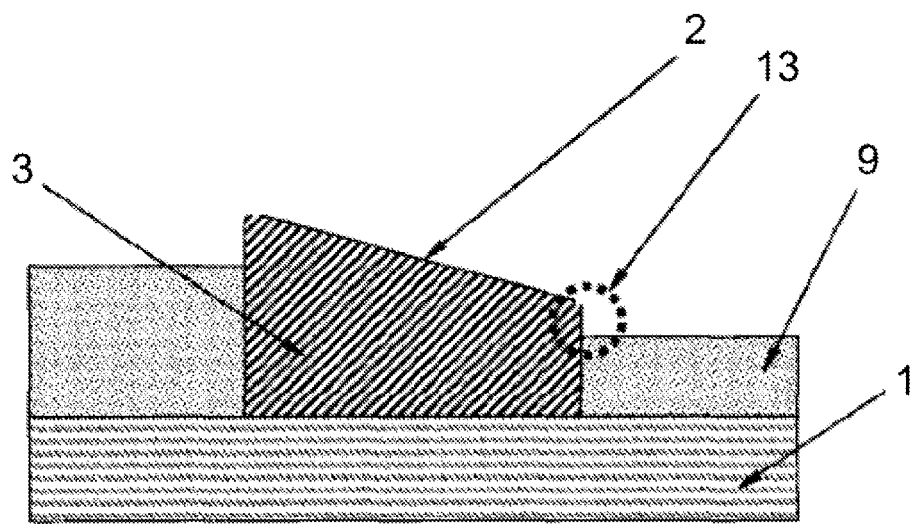

As shown in FIGS. 9A-9B, the shield layer 3 can have a step difference 13 formed near the boundary surface of the non-magnetic layer 9 and the shield layer 3 because the etching rate is much slower in RIE using these gases.

By forming the step difference 13 as described here, both the width of the groove 2 in the direction of the track width and the depth of the groove 2 can be substantially changed near the recessed end of the shield layer 3, and the cross-sectional area of the main magnetic pole formed in the groove can be greatly changed by sandwiching the side gap layer. FIGS. 9A-9B show the shape after etching the non-magnetic layer.

Figure 10A:
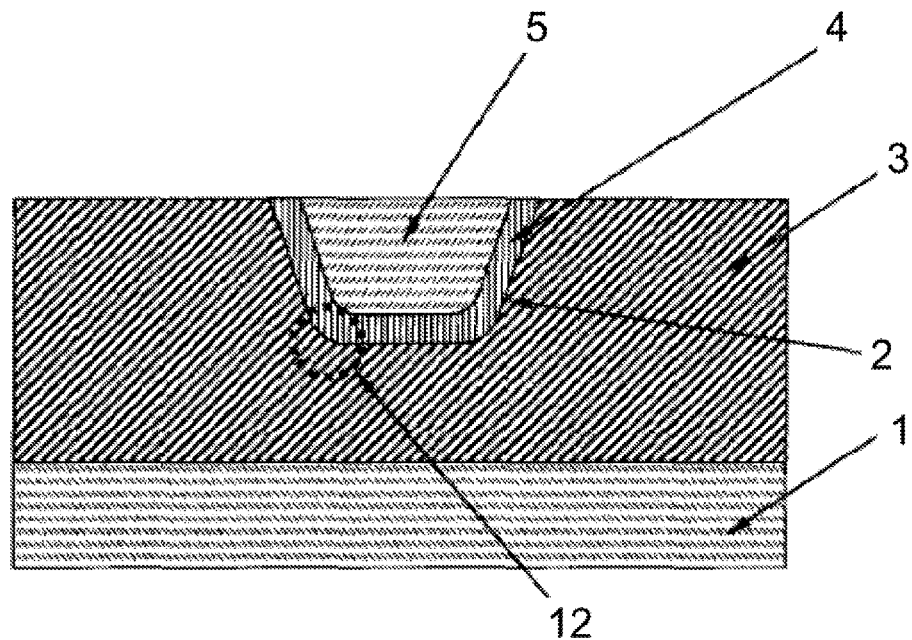
FIG. 10A is a schematic cross-sectional diagram of a perpendicular magnetic recording head during manufacture continued from FIG. 9A, according to one embodiment.
Figure 10B:
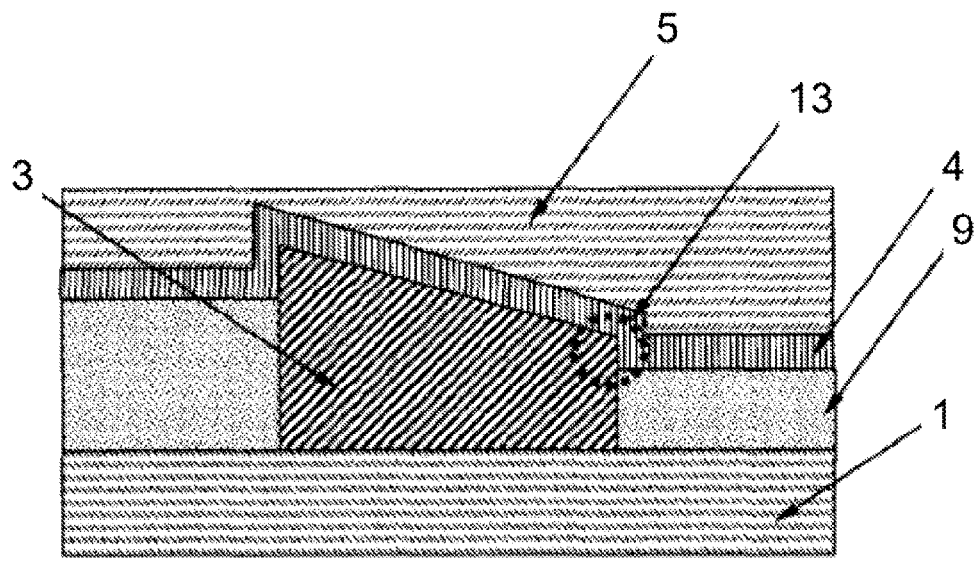
FIG. 10B is a schematic cross-sectional diagram of a perpendicular magnetic recording head during manufacture continued from FIG. 9B, according to one embodiment.

Next, as shown in FIGS. 10A-10B, the side gap layer 4 is deposited as a film. In one approach, the side gap layer may be deposited by atomic layer deposition which has high coverage on the step difference and good controllability of the film thickness.

After the seed film (not shown) for growing the plating is deposited, the main magnetic pole material is grown by the plating, and the main magnetic pole material is embedded in the groove 2 formed by the shield layer 3 and the non-magnetic layer 9 and sandwiches the side gap layer 4.

The planarization process by CMP is conducted to obtain the cross-sectional shape of the main magnetic pole reflecting the shape of the groove 2 formed by the shield layer 3 and the non-magnetic layer 9 as shown in FIGS. 10A-10B. To adjust the width of the main magnetic pole as needed in the direction of the track width at the location which becomes the ABS, ion milling may be used to etch the magnetic pole and the area surrounding the pole.

Next, the trailing gap film is deposited by a sputtering method to form a trailing gap layer 6. After that, the seed film (not shown) for growing the plating may be formed, and the plating film is grown to form a trailing shield 7.

Figure 11:
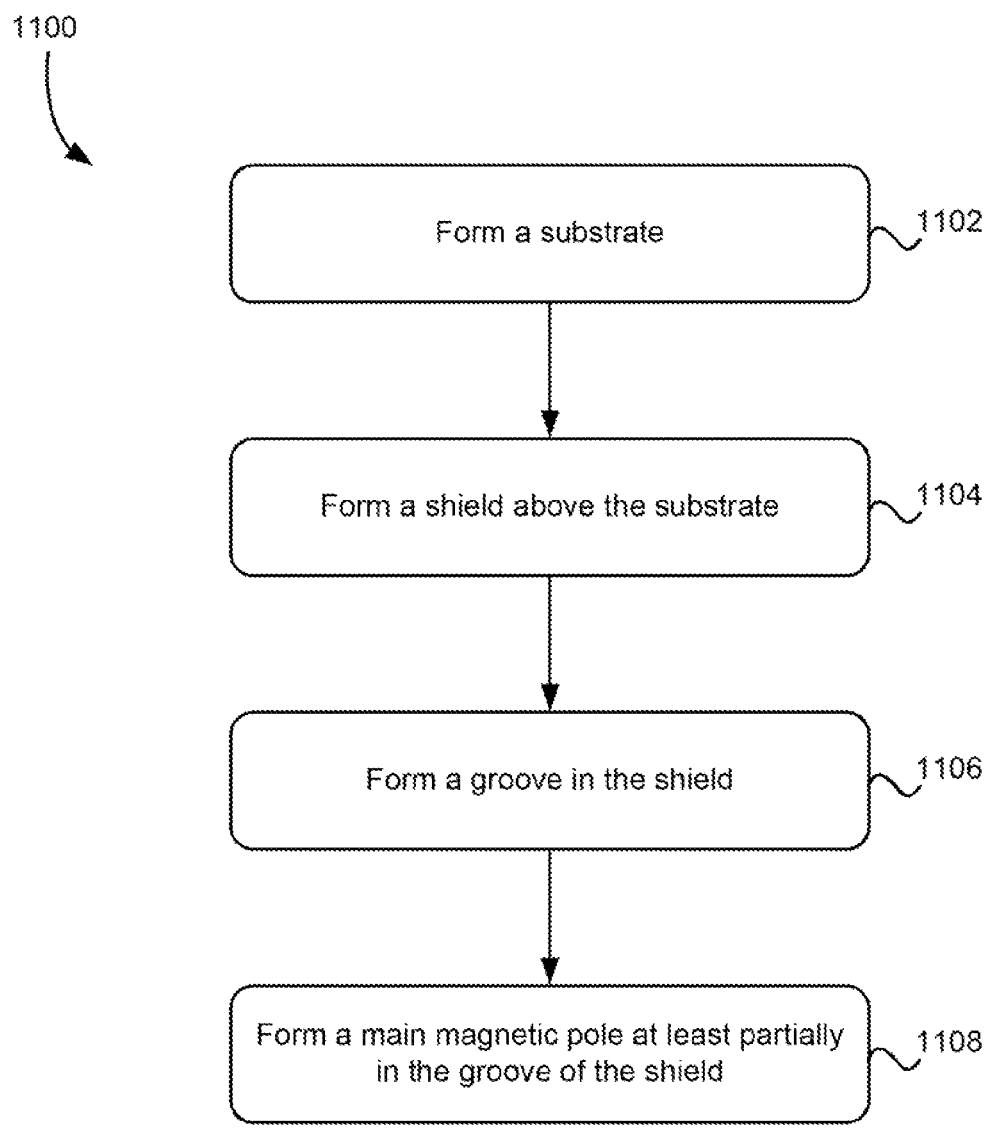
FIG. 11 is a flowchart of a method, according to one embodiment.

Referring now to FIG. 11, a method 1100 for manufacturing a perpendicular magnetic recording head is shown according to one embodiment. The method 1100 may be executed in any desired environment, and may include structures and/or embodiments described herein, or other structures as would be apparent to one of skill in the art upon reading the present descriptions.

In operation 1102, a substrate is formed. The substrate may comprise any material and may be formed through any method as would be apparent to one of skill in the art upon reading the present descriptions.

In operation 1104, a shield is formed above the substrate. The shield may comprise any material and may be formed through any method as would be apparent to one of skill in the art upon reading the present descriptions, such as a nickel-iron alloy. In one embodiment, the shield may comprise a multi-layered film having a lower shield near the substrate below the main magnetic pole and side shields above the lower shield adjacent the sides of the groove.

In operation 1106, a groove is formed in the shield. According to one approach, the groove in the shield may be formed via ion milling and/or RIE using at least one of $CH_3OH$ gas and $CO/NH_3$ gases, and possibly using both ion milling and RIE.

In operation 1108, a main magnetic pole is formed at least partially in the groove of the shield. In one approach, the main magnetic pole may be formed completely in the groove. The main magnetic pole may comprise a magnetic material, in one approach.

In a further embodiment, the method 1100 may include forming a side gap layer in the groove of the shield between the shield and the main magnetic pole, wherein the side gap layer comprises a non-magnetic material.

In another further embodiment, the method 1100 may include forming a trailing gap layer above the main magnetic pole, wherein the trailing gap layer comprises a non-magnetic material, and forming a trailing shield above the trailing gap layer and at least a portion of the shield.

In one approach, the groove in the shield comprises a bottom side near a leading edge of the shield, inclined sides extending from the bottom side toward a trailing edge of the shield, the inclined sides extending from a front surface side of the shield positioned closest to an ABS of the head to a recessed side of the shield opposite the front surface side of the shield, wherein the shield is coupled to a non-magnetic layer at the recessed side, a cross-sectional area of the groove taken parallel to an interface of the substrate and the shield at a position nearer to the substrate is less than a cross-sectional area of the groove taken parallel to the interface of the substrate and the shield at a position farther from the substrate, a cross-sectional area of the groove taken parallel to the front surface side of the shield at a position nearer to the front surface side of the shield is less than a cross-sectional area of the groove taken parallel to the front surface side of the shield at a position farther from the front surface side of the shield, and at least a portion of the groove has a curved surface.

According to another embodiment, the method 1100 may further include forming a groove in the non-magnetic layer, wherein the groove of the non-magnetic layer extends from the groove of the shield, the main magnetic pole is positioned at least partially in the groove of the non-magnetic layer, and a cross-sectional area of the groove of the non-magnetic layer taken parallel to an interface of the non-magnetic layer and the shield at a position nearer to the interface of the non-magnetic layer and the shield is less than a cross-sectional area of the groove of the non-magnetic layer taken parallel to the interface of the non-magnetic layer and the shield at a position farther from the interface of the non-magnetic layer and the shield.

In another further embodiment, the method 1100 may include forming a side gap layer positioned between the main magnetic pole and the shield, the side gap layer comprising a non-magnetic material.

In another embodiment, the at least a portion of the sides of the groove that have the curved surfaces may be formed near the recessed side of the shield.

As described above, the perpendicular magnetic recording head having the shapes shown in FIGS. 1-4 may be formed, but the invention is not so limited.

Figure 12:
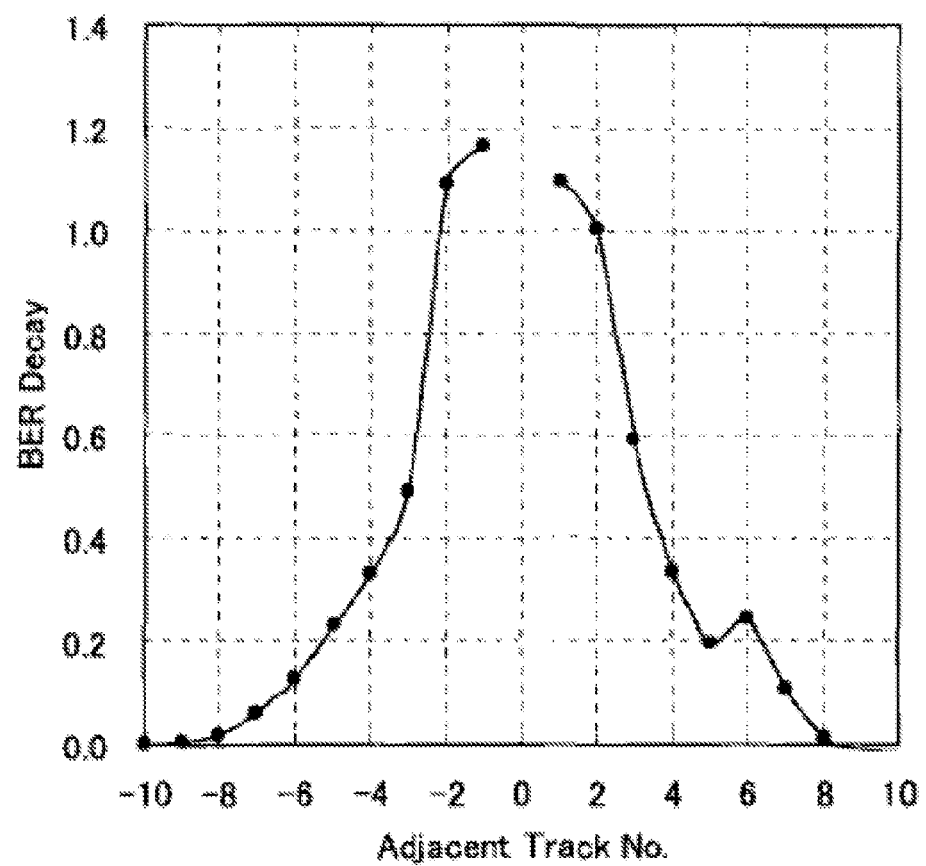
FIG. 12 is a graph showing far track interference (FTI) characteristics of a perpendicular magnetic recording head, according to the prior art.

FIG. 12 shows far track interference (FTI) characteristics obtained from a head having a conventional structure without a curved surface in the groove in the shield layer. As shown, the error rate degrades in a wide range of adjacent track positions.

Figure 13:
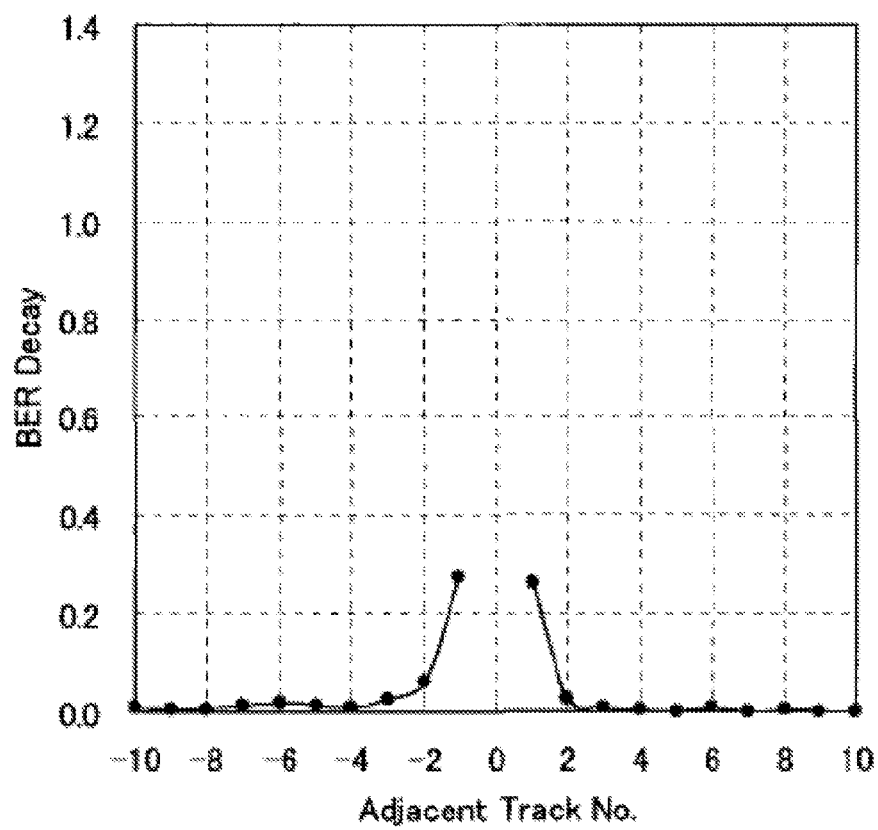
FIG. 13 is a graph showing FTI characteristics of a perpendicular magnetic recording head, according to one embodiment.

FIG. 13 shows FTI characteristics of a magnetic head formed according to embodiments presented herein. By forming a part of the groove in the shield layer into a curved surface, the effect of the magnetic field leakage on adjacent tracks disappears, and the degradation of the error rate disappears at the adjacent track positions, which is one indication demonstrating that a highly reliable head has been obtained.

Figure 14:
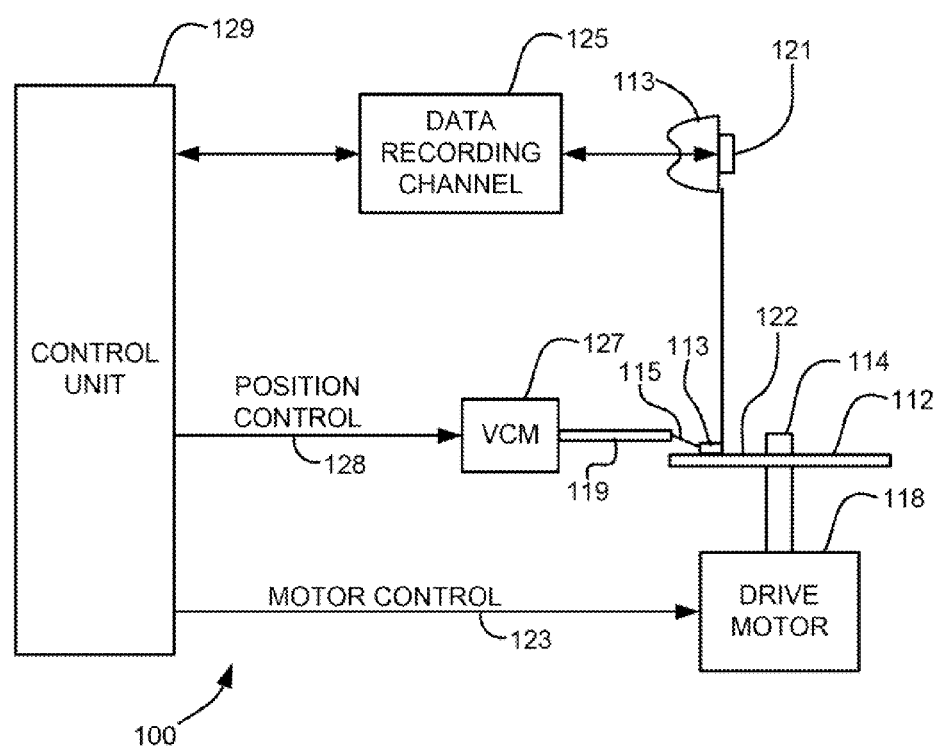
FIG. 14 is a simplified drawing of a magnetic recording disk drive system.

Referring now to FIG. 14, there is shown a disk drive 100 in accordance with one embodiment of the present invention. This disk drive 100 may be used in conjunction with any embodiments described herein, including those described in FIGS. 1-4. As shown in FIG. 14, at least one rotatable magnetic disk 112 is supported on a spindle 114 and rotated by a disk drive motor 118. The magnetic recording on each disk is typically in the form of an annular pattern of concentric data tracks (not shown) on the disk 112.

At least one slider 113 is positioned near the disk 112, each slider 113 supporting one or more magnetic read/write heads 121. As the disk rotates, slider 113 is moved radially in and out over disk surface 122 so that heads 121 may access different tracks of the disk where desired data are recorded and/or to be written. Each slider 113 is attached to an actuator arm 119 by means of a suspension 115. The suspension 115 provides a slight spring force which biases slider 113 against the disk surface 122. Each actuator arm 119 is attached to an actuator 127. The actuator 127 as shown in FIG. 14 may be a voice coil motor (VCM). The VCM comprises a coil movable within a fixed magnetic field, the direction and speed of the coil movements being controlled by the motor current signals supplied by controller 129.

During operation of the disk storage system, the rotation of disk 112 generates an air bearing between slider 113 and disk surface 122 which exerts an upward force or lift on the slider. The air bearing thus counter-balances the slight spring force of suspension 115 and supports slider 113 off and slightly above the disk surface by a small, substantially constant spacing during normal operation. Note that in some embodiments, the slider 113 may slide along the disk surface 122.

The various components of the disk storage system are controlled in operation by control signals generated by control unit 129, such as access control signals and internal clock signals. Typically, control unit 129 comprises logic control circuits, storage (e.g., memory), and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Read and write signals are communicated to and from read/write heads 121 by way of recording channel 125.

The above description of a typical magnetic disk storage system, and the accompanying illustration of FIG. 14 is for representation purposes only. It should be apparent that disk storage systems may contain a large number of disks and actuators, and each actuator may support a number of sliders.

An interface may also be provided for communication between the disk drive and a host (integral or external) to send and receive the data and for controlling the operation of the disk drive and communicating the status of the disk drive to the host, all as will be understood by those of skill in the art.

In a typical head, an inductive write head includes a coil layer embedded in one or more insulation layers (insulation stack), the insulation stack being located between first and second pole piece layers. A gap is formed between the first and second pole piece layers by a gap layer at an ABS of the write head. The pole piece layers may be connected at a back gap. Currents are conducted through the coil layer, which produce magnetic fields in the pole pieces. The magnetic fields fringe across the gap at the ABS for the purpose of writing bits of magnetic field information in tracks on moving media, such as in circular tracks on a rotating magnetic disk.

The second pole piece layer has a pole tip portion which extends from the ABS to a flare point and a yoke portion which extends from the flare point to the back gap. The flare point is where the second pole piece begins to widen (flare) to form the yoke. The placement of the flare point directly affects the magnitude of the magnetic field produced to write information on the recording medium.

For example, in one embodiment, a magnetic data storage system 100 comprises at least one perpendicular magnetic recording head 121 as described herein according to any embodiment, a magnetic recording medium 112, a drive mechanism 118 for passing the magnetic recording medium 112 over the at least one perpendicular magnetic recording head 121, and a controller 129 electrically coupled to the at least one perpendicular magnetic recording head 121 for controlling operation of the at least one perpendicular magnetic recording head 121.

While various embodiments have been described above, it should be understood that they have been presented by way of example only and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A perpendicular magnetic recording head, comprising:
a shield above a substrate, the shield comprising:
a groove, the groove comprising:
a bottom side near a leading edge of the shield;
inclined sides extending from the bottom side toward a trailing edge of the shield, the inclined sides extending from a front surface side of the shield positioned closest to an air bearing surface (ABS) of the head to a recessed side of the shield opposite the front surface side of the shield,
wherein the shield is coupled to a non-magnetic layer at the recessed side,
wherein a cross-sectional area of the groove taken parallel to an interface of the substrate and the shield at a position nearer to the substrate is less than a cross-sectional area of the groove taken parallel to the interface of the substrate and the shield at a position farther from the substrate,
wherein a cross-sectional area of the groove taken parallel to the front surface side of the shield at a position nearer to the front surface side of the shield is less than a cross-sectional area of the groove taken parallel to the front surface side of the shield at a position farther from the front surface side of the shield,
wherein at least a portion of the sides of the groove have curved surfaces; and
a main magnetic pole positioned at least partially in the groove of the shield.

2. The perpendicular magnetic recording head as recited in claim 1,
wherein the non-magnetic layer comprises a groove, the groove of the non-magnetic layer extending from the groove of the shield,
wherein the main magnetic pole is positioned at least partially in the groove of the non-magnetic layer,
wherein a cross-sectional area of the groove of the non-magnetic layer taken parallel to an interface of the non-magnetic layer and the shield at a position nearer to the interface of the non-magnetic layer and the shield is less than a cross-sectional area of the groove of the non-magnetic layer taken parallel to the interface of the non-magnetic layer and the shield at a position farther from the interface of the non-magnetic layer and the shield.

3. The perpendicular magnetic recording head as recited in claim 2, wherein a cross-sectional area of the main magnetic pole at a position in the groove of the shield is less than a cross-sectional area of the main magnetic pole at a position in the groove of the non-magnetic layer, wherein the cross-sectional area of the main magnetic pole is taken parallel to the interface of the non-magnetic layer and the shield.

4. The perpendicular magnetic recording head as recited in claim 1, further comprising a side gap layer positioned between the main magnetic pole and the shield, the side gap layer comprising a non-magnetic material.

5. The perpendicular magnetic recording head as recited in claim 1, wherein the at least a portion of the sides of the groove that have the curved surfaces are near the recessed side of the shield.

6. The perpendicular magnetic recording head as recited in claim 1,
wherein a first flare angle of the main magnetic pole near the recessed side of the shield is greater than each of: a second flare angle of the main magnetic pole near the ABS and a third flare angle of the main magnetic pole near an interface of the non-magnetic layer and the shield, and
wherein each flare angle is measured from perpendicular to a plane of the ABS and sides of the main magnetic pole.

7. The perpendicular magnetic recording head as recited in claim 1, wherein the shield comprises a multi-layered film having:
a lower shield near the substrate below the main magnetic pole; and
side shields above the lower shield adjacent the sides of the groove.

8. The perpendicular magnetic recording head as recited in claim 1, wherein the main magnetic pole has an inverted triangular cross-sectional shape near the ABS, with one corner of the triangular shape being nearer the leading edge of the shield, and two other corners of the triangular shape being nearer the trailing edge of the shield.

9. A magnetic data storage system, comprising:
at least one perpendicular magnetic recording head as recited in claim 1;
a magnetic recording medium;
a drive mechanism for passing the magnetic recording medium over the at least one perpendicular magnetic recording head; and
a controller electrically coupled to the at least one perpendicular magnetic recording head for controlling operation of the at least one perpendicular magnetic recording head.

10. A method for manufacturing a perpendicular magnetic recording head, the method comprising:
forming a substrate;
forming a shield above the substrate;
forming a groove in the shield; and
forming a main magnetic pole at least partially in the groove of the shield.

11. The method as recited in claim 10, further comprising forming a side gap layer in the groove of the shield between the shield and the main magnetic pole, wherein the side gap layer comprises a non-magnetic material.

12. The method as recited in claim 10, further comprising:
forming a trailing gap layer above the main magnetic pole, wherein the trailing gap layer comprises a non-magnetic material; and
forming a trailing shield above the trailing gap layer and at least a portion of the shield.

13. The method as recited in claim 10, wherein the groove in the shield comprises:
a bottom side near a leading edge of the shield;
inclined sides extending from the bottom side toward a trailing edge of the shield, the inclined sides extending from a front surface side of the shield positioned closest to an air bearing surface (ABS) of the head to a recessed side of the shield opposite the front surface side of the shield,
wherein the shield is coupled to a non-magnetic layer at the recessed side,
wherein a cross-sectional area of the groove taken parallel to an interface of the substrate and the shield at a position nearer to the substrate is less than a cross-sectional area of the groove taken parallel to the interface of the substrate and the shield at a position farther from the substrate, wherein a cross-sectional area of the groove taken parallel to the front surface side of the shield at a position nearer to the front surface side of the shield is less than a cross-sectional area of the groove taken parallel to the front surface side of the shield at a position farther from the front surface side of the shield, and wherein at least a portion of the groove has a curved surface.

14. The method as recited in claim 10, further comprising forming a groove in the non-magnetic layer, wherein the groove of the non-magnetic layer extends from the groove of the shield, wherein the main magnetic pole is positioned at least partially in the groove of the non-magnetic layer, wherein a cross-sectional area of the groove of the non-magnetic layer taken parallel to an interface of the non-magnetic layer and the shield at a position nearer to the interface of the non-magnetic layer and the shield is less than a cross-sectional area of the groove of the non-magnetic layer taken parallel to the interface of the non-magnetic layer and the shield at a position farther from the interface of the non-magnetic layer and the shield.

15. The method as recited in claim 10, further comprising forming a side gap layer positioned between the main magnetic pole and the shield, the side gap layer comprising a non-magnetic material.

16. The method as recited in claim 10, wherein the at least a portion of the sides of the groove that have the curved surfaces are formed near the recessed side of the shield.

17. The method as recited in claim 10, wherein the groove in the shield is formed via reactive ion etching (RIE) using at least one of $CH_4OH$ gas and CO/NH: gases.

18. The method as recited in claim 10, wherein the groove in the shield is formed via ion milling.

19. The method as recited in claim 10, wherein the groove in the shield is formed via both ion milling and reactive ion etching (RIE) using at least one of $CH_3OH$ gas and $CO/NH_3$ gases.

20. The method as recited in claim 10, wherein the shield comprises a multi-layered film having:

a lower shield near the substrate below the main magnetic pole; and side shields above the lower shield adjacent the sides of the groove.

* * * * *

UNITED STATES PATENT AND TRADEMARK OFFICE
CERTIFICATE OF CORRECTION

| | | |
|---|---|---|
| PATENT NO. | : 8,189,293 B1 | Page 1 of 1 |
| APPLICATION NO. | : 13/096775 | |
| DATED | : May 29, 2012 | |
| INVENTOR(S) | : Yasuhiro Wakabayashi et al. | |

It is certified that error appears in the above-identified patent and that said Letters Patent is hereby corrected as shown below:

col. 3, line 10, replace "FIG. 98" with --FIG. 9B--;

col. 5, line 35, replace "pole S" with --pole 5--.

col. 14, line 7, replace "CO/NH:" with --CO/NH$_3$--.

Signed and Sealed this
Seventh Day of August, 2012

David J. Kappos
*Director of the United States Patent and Trademark Office*